(12) United States Patent
Hong

(10) Patent No.: US 7,333,550 B2
(45) Date of Patent: Feb. 19, 2008

(54) BIT PROCESSING METHOD FOR ADAPTIVE MULTIRATE MODULATION

(75) Inventor: Sung-Kwon Hong, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 750 days.

(21) Appl. No.: 10/696,070

(22) Filed: Oct. 28, 2003

(65) Prior Publication Data

US 2004/0086033 A1    May 6, 2004

(30) Foreign Application Priority Data

Oct. 31, 2002    (KR) .................. 10-2002-0067239

(51) Int. Cl.
H04L 5/12    (2006.01)
H04L 23/02    (2006.01)

(52) U.S. Cl. .................. 375/261; 375/222; 375/298

(58) Field of Classification Search .............. 375/222, 375/261, 279, 298, 308; 370/252; 332/103; 455/522

See application file for complete search history.

(56) References Cited

U.S. PATENT DOCUMENTS 6,996,069 B2 *   2/2006   Willenegger ............... 370/252
7,095,290 B2 *   8/2006   Hakkinen et al. .......... 332/103

FOREIGN PATENT DOCUMENTS

| CN | 1325200 A | 12/2001 |
|---|---|---|
| EP | 0 961 515 A1 | 5/1998 |
| EP | 1 271 874 A1 | 5/2001 |
| JP | WO 02/065723 * | 8/2002 |
| WO | WO 2002/065723 | 8/2002 |

* cited by examiner

Primary Examiner—Phuong Phu
(74) Attorney, Agent, or Firm—Lee, Hong, Degerman, Kang & Schmadeka

(57) ABSTRACT

A discontinuous transmission (DTX) bit processing method for a multirate modulation scheme is provided. The method comprises receiving a symbol; determining whether the symbol comprises at least one DTX bit; mapping the symbol to a predetermined mapping point (S) on an IQ plane; minimizing a transmission power level if the symbol has at least one DTX bit; and transmitting the symbol in the transmission power level of the mapping point.

15 Claims, 7 Drawing Sheets

DTX Bit Mapping

DTX Bit Mapping

16 QAM Constellation

FIG. 4B

1XX0 Mapping Point (X is DTX bit)

FIG.5

BIT PROCESSING METHOD FOR ADAPTIVE MULTIRATE MODULATION

CROSS REFERENCE TO RELATED APPLICATION

Pursuant to 35 U.S.C. § 119(a), this application claims the benefit of earlier filing date and right of priority to Korean Patent Application No. 2002-67239, filed on Oct. 31, 2002, the content of which is hereby incorporated by reference herein in its entirety.

BACKGROUND OF THE INVENTION

1. Field of the Invention

The present invention relates a radio communication system and, more particularly, to a discontinuous transmission (DTX) bit processing method for an adaptive multirate modulation.

2. Description of the Related Art

With the emergence of the information society, the center of services of telecommunication field is shifted from the low speed voice communication service to a multimedia service providing audio, video as well as voice communication. In order to support multimedia services that require high speed data transmission, it is critical to maximize the channel capacity by effectively utilizing the limited resources such as power and frequency band.

For effective utilization of the limited resources, various modulation techniques have been developed. In case of a wired network, channel characteristics are stable so that high efficiency QAM modulation/demodulation techniques are widely used. A radio network, generally, is not stable compared to the wired network, due to multipath transmission and fading according to a Doppler effect. A frequency shift keying (FSK) or a phase shift keying (PSK) modulation in which 1~2 bits are transferred per 1 Hz. However, recently, with the development of the modulation technique, a multirate modulation scheme such as 16-QAM, 64-QAM, or the like is adopted even in the radio network.

The current and undergoing radio communication systems in the domestic and foreign countries are likely to adopt a fixed modulation scheme regardless of a channel state between the base station and the subscriber. Such a system has a problem in that that a low rate modulation scheme is used, even when a high rate modulation can be used in a good channel state, resulting in failure of maximization of the system capacity.

Also, the system adopting the fixed modulation scheme can not change the modulation rate such that the same low rate modulation is used even when the channel state is bad. Accordingly, the transmission quality is further degraded, and causes the communication channel to break.

In order to solve the above problems, the $3^{rd}$ Generation Partnership Project (3GPP) standard conference has discussed a High speed Downlink Packet Access (HSDPA) on the basis of an adaptive modulation.

In the quadrature phase shift keying (QPSK) modulation, the DTX bit can be allocated to one of In-Phase (I) and quadrature (Q) axes in the IQ plane so that the transmission rate can be decreased by turning off the transmission power to the axis to which the DTX bit is allocated.

Since the discussion on the HSDPA proceeded, the multirate modulation scheme such as the QAM (Quadrature Amplitude Modulation) that generates four bits out of one baud has been adopted for flexible modulation, in which the DTX bit allocation as in the QPSK is not adopted. In the HSDPA of the 3GPP standard, a multirate modulation such as 16-QAM or 64-QAM as well as the QPSK, is used. In the case of the multirate modulation, a problem is how to process the DTX bits. In this regard, Mitsubishi has proposed a DTX bit processing method in which DTX bits are bound into one symbol and then mapped into the origin of an IQ plane.

Figure 1A:
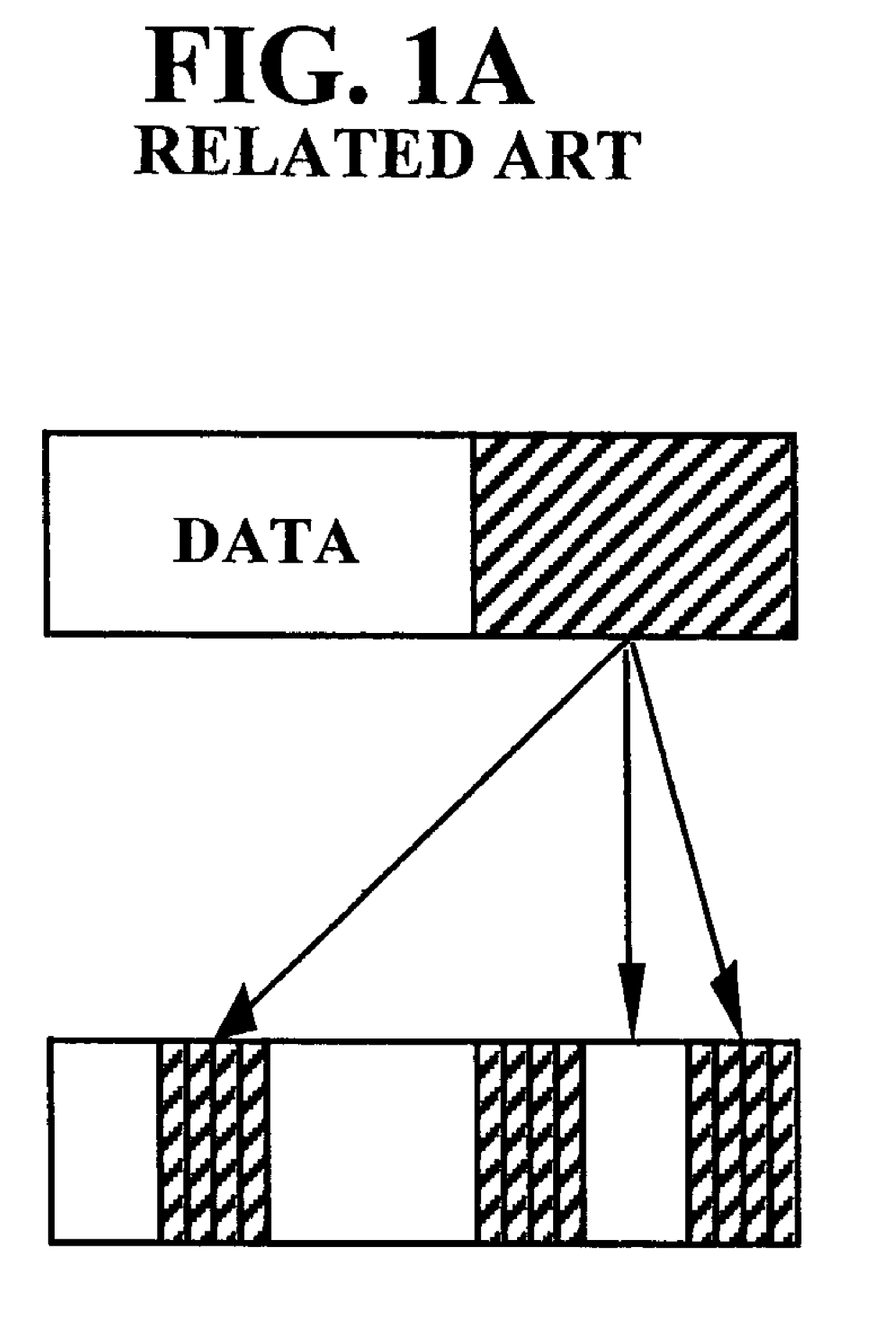
FIG. 1A illustrates a conventional method for allocating DTX bits into symbols in accordance with one or more embodiments.
Figure 1B:
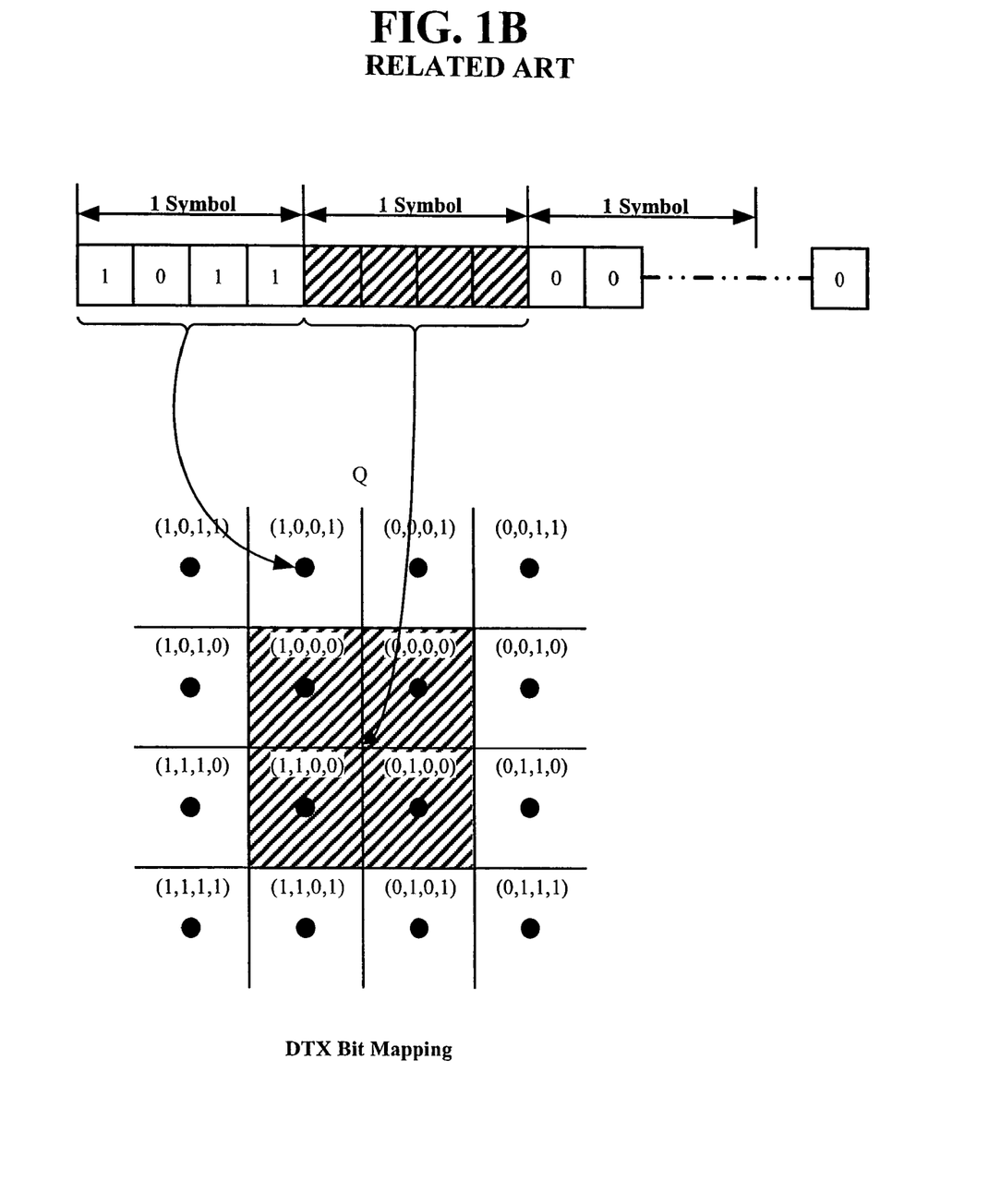
FIG. 1B illustrates how a symbol having DTX bits of FIG. 1A is mapped on an IQ plane in accordance with one or more embodiments.
Figure 2A:
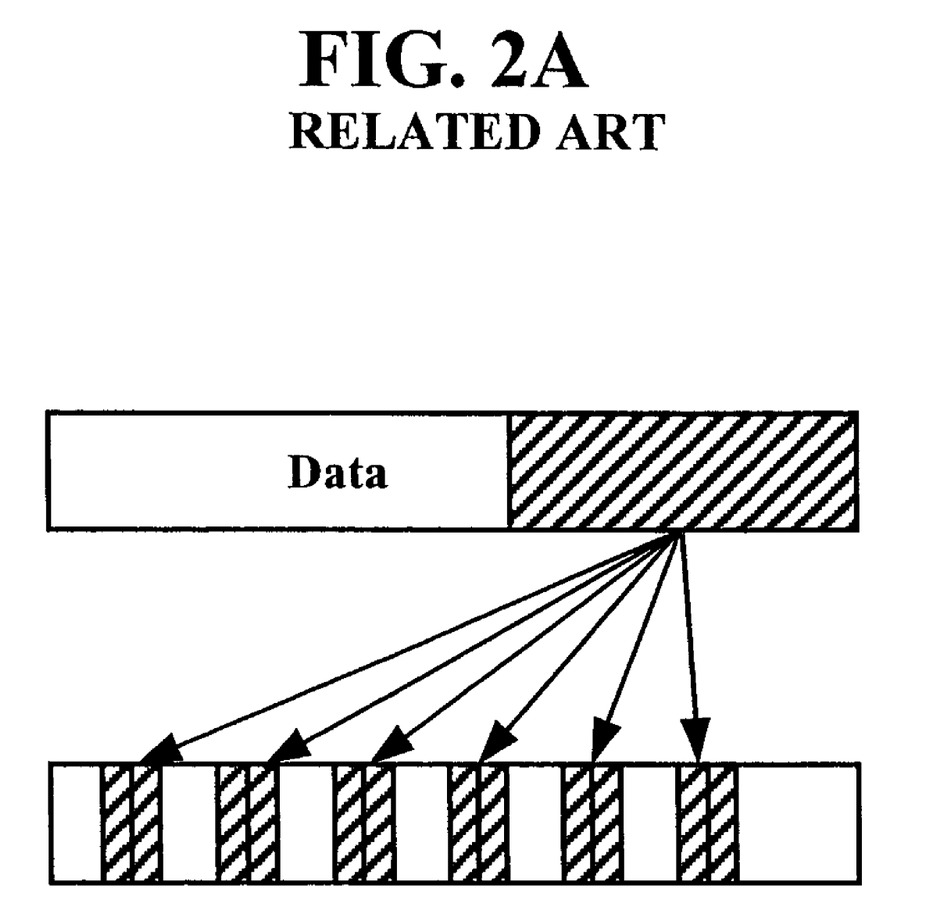
FIG. 2A illustrates a conventional method for allocating DTX bits into symbols in accordance with one or more embodiments.
Figure 2B:
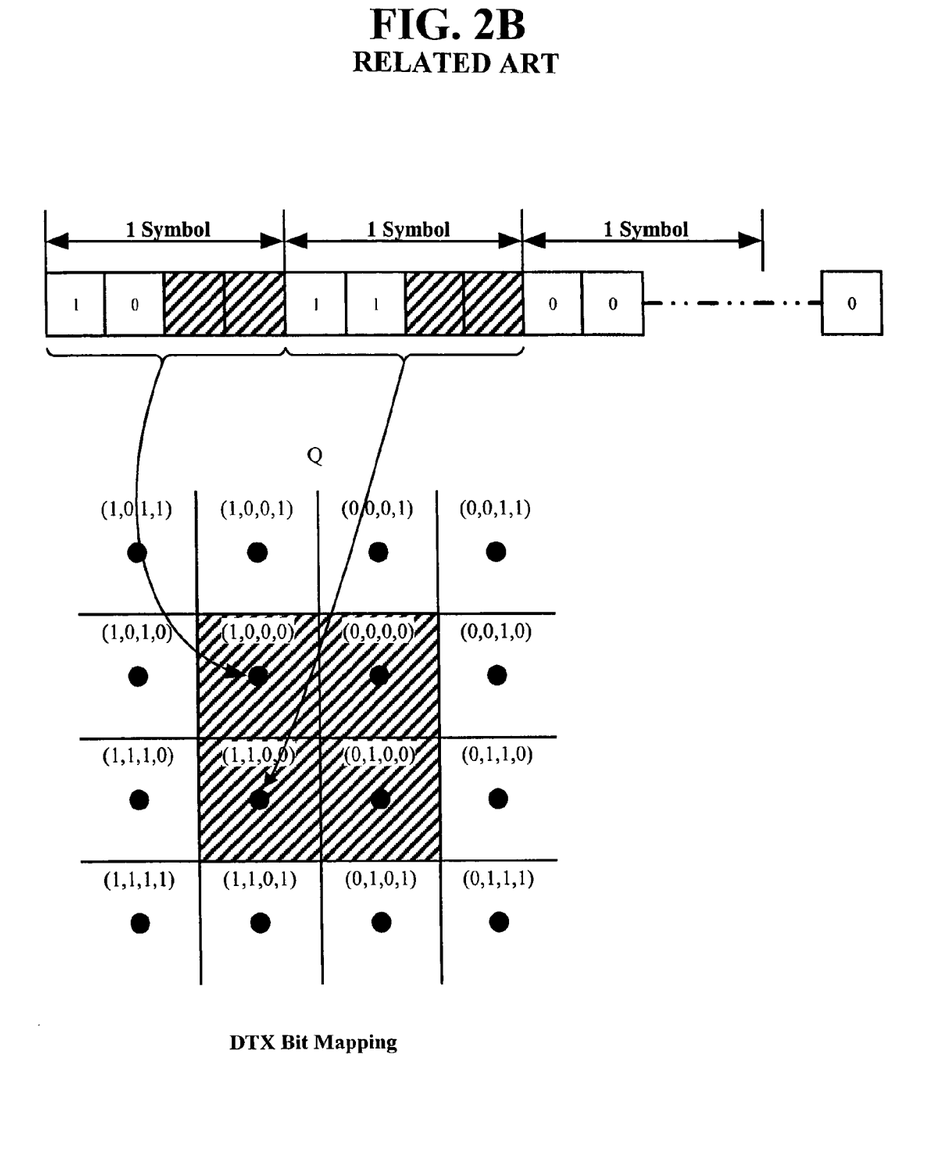
FIG. 2B illustrates how a symbol having DTX bits of FIG. 2A is mapped on an IQ plane in accordance with one or more embodiments.

FIG. 1A, FIG. 1B, FIG. 2A, and FIG. 2B illustrate the DTX bit processing method proposed by the Mitsubishi. As shown in FIG. 1A, the empty region of a frame is bound into a 4 bit DTX symbol and then the DTX symbol is mapped to the origin of the IQ plane (see FIG. 1B). In FIG. 2A and FIG. 2B, the empty region of a frame is allocated into each 4 bit symbol to be transmitted by 2 bits such that only 4 symbol points of the IQ plane are used for transmit.

The above DTX bit processing method has a drawback in that this method may not be compatible with the currently developing system since this method requires modification of the current multiplexing scheme. Also, it is very complicated to implement the algorithm in which DTX bits are grouped in one symbol so as to be mapped to the origin or 2 bits are inserted into each data symbol so as to be transmitted using only four symbol points on the IQ plane.

SUMMARY OF THE INVENTION

A bit processing method for a multirate modulation scheme is provided. The method comprises receiving a symbol; determining whether the symbol comprises at least one DTX bit; mapping the symbol to a predetermined mapping point (S) on an IQ plane; minimizing a transmission power level if the symbol has at least one DTX bit; and transmitting the symbol in the transmission power level of the mapping point.

The mapping point is calculated by averaging signal points in which bits corresponding to non-DTX bits of the symbol are identical with each other on the IQ plane. The mapping point is set in consideration of at least one of a number of the non-DTX bits, a number of the selected signal points, and locations of the selected signal points on the IQ plane. The symbol is mapped to an origin of the IQ plane, when all bits of the symbol are DTX bits.

The symbol is mapped to a signal point in which bits are identical with the bits consisting of the symbol on the IQ plane when the symbol has no DTX bit. The mapping point is set in consideration of plus and minus symbols of the signal points on the IQ plane. In some embodiments, the mapping point is set in consideration of at least one of number of the non-DTX bits, number of the selected signal points, and locations of the selected signal points on the IQ plane.

In certain embodiments, the symbol is mapped to an origin of the IQ Plane, when all bits of the symbol are DTX bits. The symbol is mapped to a signal point of which bits are identical with the bits comprising the symbol on the IQ plane, when the symbol has no DTX bit. In one embodiment of the present invention, a DTX bit processing method reduces the transmission power consumption by mapping a symbol having DTX bits to a predetermined signal point, on an IQ plane.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 3:
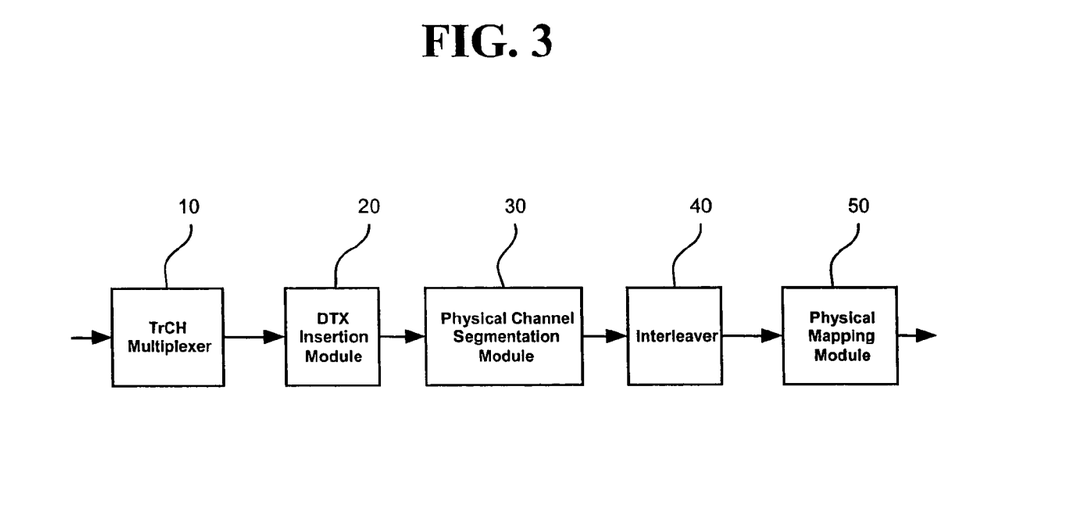
FIG. 3 is a schematic view illustrating a transmitter of a base station modem adopting a DTX bit processing method in accordance with one embodiment of the present invention.

Referring to FIG. 3, a transmitter of a base station modem comprises a transport channel (TrCH) multiplexer 10 for multiplexing radio frames from each TrCHs into a composite transport channel (CCTrCH); a DTX insertion module 20 for inserting DTX bits into the radio frames of the CCTrCH; a physical channel segmentation module 30 for segmenting the CCTrCH for different physical channels (PhCHs); an interleaver 40 for interleaving the segments; and a PhCH mapping module 50 for mapping the segments to the corresponding PhCHs.

Figure 4A:
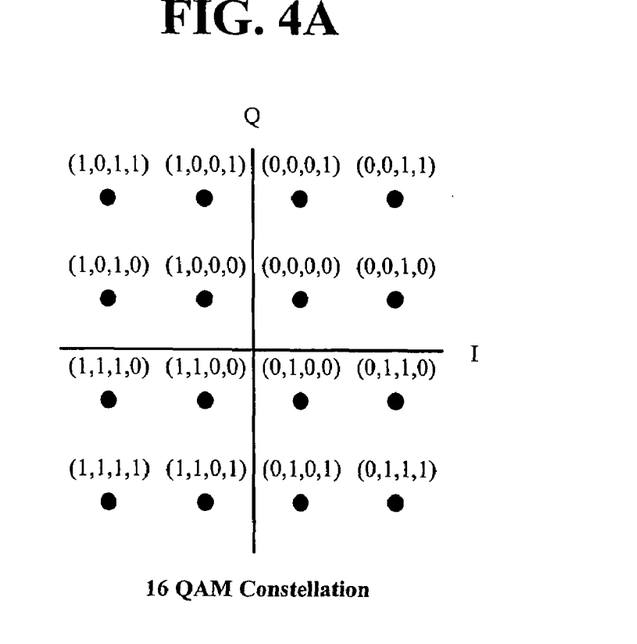
FIG. 4A is an exemplary constellation diagram of a 16-QAM in accordance with one embodiment.
Figure 4B:
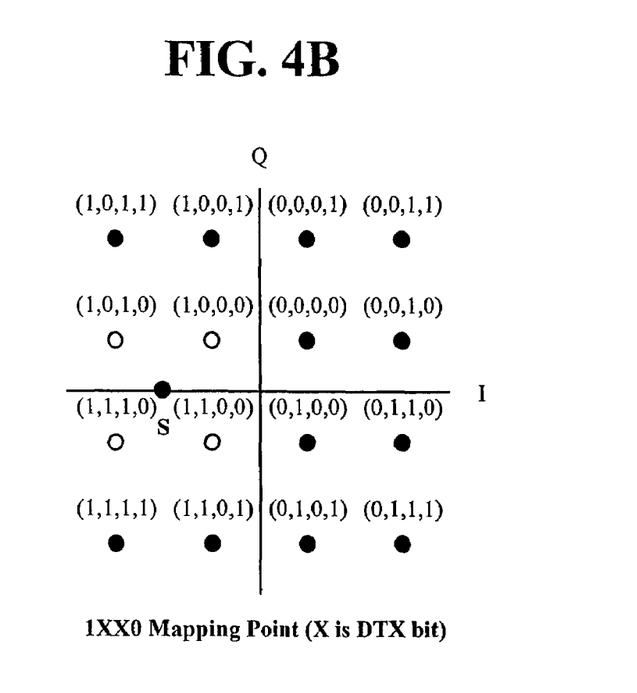
FIG. 4B illustrates how a symbol having DTX bits is mapped on an IQ plane in accordance with one embodiment of the present invention.

FIG. 4A is a typical constellation diagram of a 16-QAM and FIG. 4B is a constellation diagram for illustrating how a symbol having DTX bits is mapped on an IQ plane in accordance with the present invention. As shown in FIG. 4A, 4 bits are allocated to determine a symbol in the 16-QAM (as a matter of course, 6 bits are to be allocated in the 64-QAM), for example. Accordingly, one to four DTX bits can be allocated to the symbol.

In the multirate modulation of MQAM, 'M' is the exponentiation value of 2. Accordingly, 1 to m DTX bits can be inserted into one symbol. DTX bits can be positioned in the symbol modulated by MQAM according to the number of DTX bits. In some embodiments, the symbol in which M bits are DTX bits is mapped to the origin of the IQ plane and the symbol including DTX bit(s) less than M are mapped to a predetermined signal point, on an IQ plane. The IQ plane is defined by averaging vectors of the signal points. The bits corresponding to the non-DTX bits of the symbol are identical with each other, in consideration of the quadrants to which the signal points are located, for example.

Referring to FIG. 4B, when a symbol having, for example, a bit order of 1XX0 (X is DTX bit) is inputted, 4 signal points (e.g., 1000, 1010, 1100, and 1110) are selected on the IQ plane. The left most bit and the right most bit can be identical with each other. The vector values of the 4 signal points are averaged so as to obtain a mapping point (S). Accordingly, the symbol of 1xx0 is mapped to the mapping point (S).

In the same manner, when, for example, a symbol of 1XXX is inputted, eight signal points (i.e., 1011, 1001, 1010, 1000, 1110, 1100, 1111, and 1101) of which the left-most bit is one, and others are DTX bits are selected and averaged for calculating the mapping point (S). The mapping point (S) for the symbol of 1xxx is defined in consideration of the number of the non-DTX bit, the number of the selected signal points, and the locations of the selected signal points on the IQ plane so as to distinguish from the mapping point for the symbol of 1xx0. In certain embodiments, the symbol in which all the bits are DTX bits is mapped to the origin of the IQ plane. For example, 16QAM is adopted in one embodiment.

Figure 5:
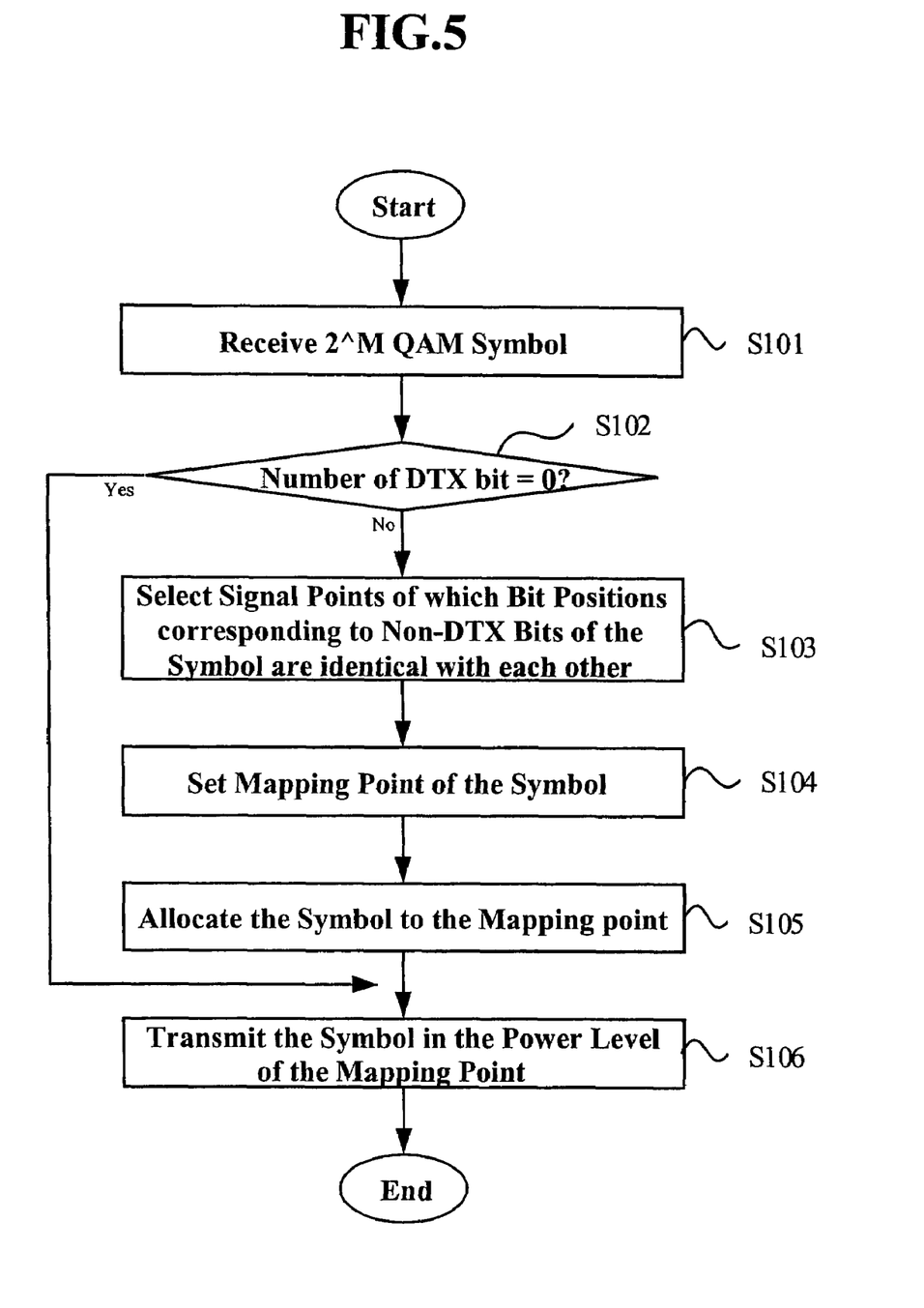
FIG. 5 is a flowchart illustrating a DTX bit processing method in accordance with one embodiment of the invention.

FIG. 5 is a flowchart illustrating the DTX bit processing method in accordance with one embodiment of the present invention. In FIG. 5, when 2^M bit QAM modulated signal is inputted to the DTX insertion module 20 from the TrCH multiplexer 10, the DTX insertion module 20 inserts DTX bits into the signal to be transmitted, if required. After passing through the DTX insertion module 20, the signal is segmented by the physical channel segmentation module 30, interleaved by the interleaver 40 and then transmitted to the physical channel mapping module 50 (at step S101), for example.

The physical channel mapping module 50 determines whether or not there exists DTX bit(s) in the input signal (step S102). In some embodiments, if there is a DTX bit in the symbol, the physical channel mapping module 50 selects the signal points in which the bit(s) corresponding to the non-DTX bit(s) of the symbol is/are, for example, identical with each other on the IQ plane (step S103) and averages the vectors of the signal points on the basis of the I and Q axes of the IQ plane so as to define a mapping point (S) (step S104). In this case the mapping point (S) is defined in consideration of the number of the non-DTX bit, the number of the selected signal points, and the locations of the selected signal points on the IQ plane.

Subsequently, the physical channel mapping module 50 maps the symbol to the mapping point (S) (step S105) and transmits the symbol in the power level associated to the mapping point (S) (step S106). The symbol in which all the bits are DTX bits is mapped to the origin of the IQ plane.

In certain embodiments, in the DTX bit processing method, the symbol having the DTX bit(s) is mapped into a mapping point which requires a low transmission power level such that it is possible to minimize the transmission power consumption without modifying the typical modulation scheme for the HSDPA system.

Also, the DTX bit processing method of the present invention has an advantage in that the DTX bit processing algorithm can be simply implemented and easily applied to the actual communication system since that does not require any modification in the conventional modulation algorithm.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A discontinuous transmission (DTX) bit processing method for a multirate modulation scheme comprising:
   receiving a symbol; determining whether the symbol comprises at least one DTX bit;
   mapping the symbol to a predetermined mapping point (S) on an IQ plane when the symbol has no DTX bits, wherein the symbol is mapped to a signal point in which bits are identical with the bits consisting of the symbol on the IQ plane, and mapping the symbol to an origin of the IQ plane when at least one bit of the symbol is a DTX bit;
   minimizing a transmission power level if the symbol has at least one DTX bit; and
   transmitting the symbol in the transmission power level of the mapping point.

2. The method of claim 1, wherein the mapping point is calculated by averaging signal points in which bits corresponding to non-DTX bits of the symbol are approximately identical with each other on the IQ plane.

3. The method of claim 2, wherein the mapping point is set in consideration of at least one of a number of the non-DTX bits, a number of the selected signal points, and locations of the selected signal points on the IQ plane.

4. The method of claim 2, wherein the mapping point is set in consideration of plus and minus symbols of the signal points on the IQ plane.

5. The method of claim 4, wherein the mapping point is set in consideration of at least one of number of the non-DTX bits, number of the selected signal points, and locations of the selected signal points on the IQ plane.

6. The method of claim 5, wherein the symbol is mapped to an origin of the IQ Plane, when at least one bit of the symbol is a DTX bit.

7. The method of claim 6, wherein the symbol is mapped to a signal point in which bits are approximately identical with bits comprising the symbol in the IQ plane, if the symbol has no DTX bit.

8. A transmitter of a base station modem comprising:
   a transport channel (TrCH) multiplexer for multiplexing radio frames from a plurality of transport channels into a composite transport channel (CCTrCH);
   a discontinuous transmission (DTX) insertion module for inserting DTX bits into the radio frames of the CCTrCH, wherein the DTX insertion module maps a symbol to a signal point in which bits are identical with the bits consisting of the symbol on an IQ plane when the symbol has no DTX bit, and wherein the symbol is mapped to an origin of the IQ plane when at least one bit of the symbol is a DTX bit;
   a physical channel segmentation module for segmenting the CCTrCH for different physical channels (PhCHs) to produce a plurality of segments;
   an interleaver for interleaving the segments; and
   a physical channel mapping module for mapping the segments to the corresponding PhCHs.

9. A discontinuous transmission (DTX) bit processing system comprising:
   means for receiving a symbol; means for determining whether the symbol comprises at least one DTX bit;
   means for mapping the symbol to a predetermined mapping point (S) on an IQ plane when the symbol has no DTX bits, wherein the symbol is mapped to a signal point in which bits are identical with the bits consisting of the symbol on the lQ plane, and mapping the symbol to an origin of the IQ plane when at least one bit of the symbol is a DTX bit;
   means for minimizing a transmission power level if the symbol has at least one DTX bit; and
   means for transmitting the symbol in the transmission power level of the mapping point.

10. The system of claim 9, wherein the mapping point is calculated by averaging signal points in which bits corresponding to non-DTX bits of the symbol are approximately identical with each other on the IQ plane.

11. The system of claim 10, wherein the mapping point is set in consideration of at least one of a number of the non-DTX bits, a number of the selected signal points, and locations of the selected signal points on the IQ plane.

12. The system of claim 10, wherein the mapping point is set in consideration of plus and minus symbols of the signal points on the IQ plane.

13. The system of claim 12, wherein the mapping point is set in consideration of at least one of number of the non-DTX bits, number of the selected signal points, and locations of the selected signal points on the IQ plane.

14. The system of claim 13, wherein the symbol is mapped to an origin of the IQ Plane, when at least one bit of the symbol is a DTX bit.

15. The system of claim 14, wherein the symbol is mapped to a signal point in which bits are approximately identical with bits comprising the symbol in the IQ plane, if the symbol has no DTX bit.

* * * * *